Dec. 26, 1933. E. A. CONNER ET AL 1,940,845
BRAKE
Filed Aug. 30, 1930 2 Sheets-Sheet 2
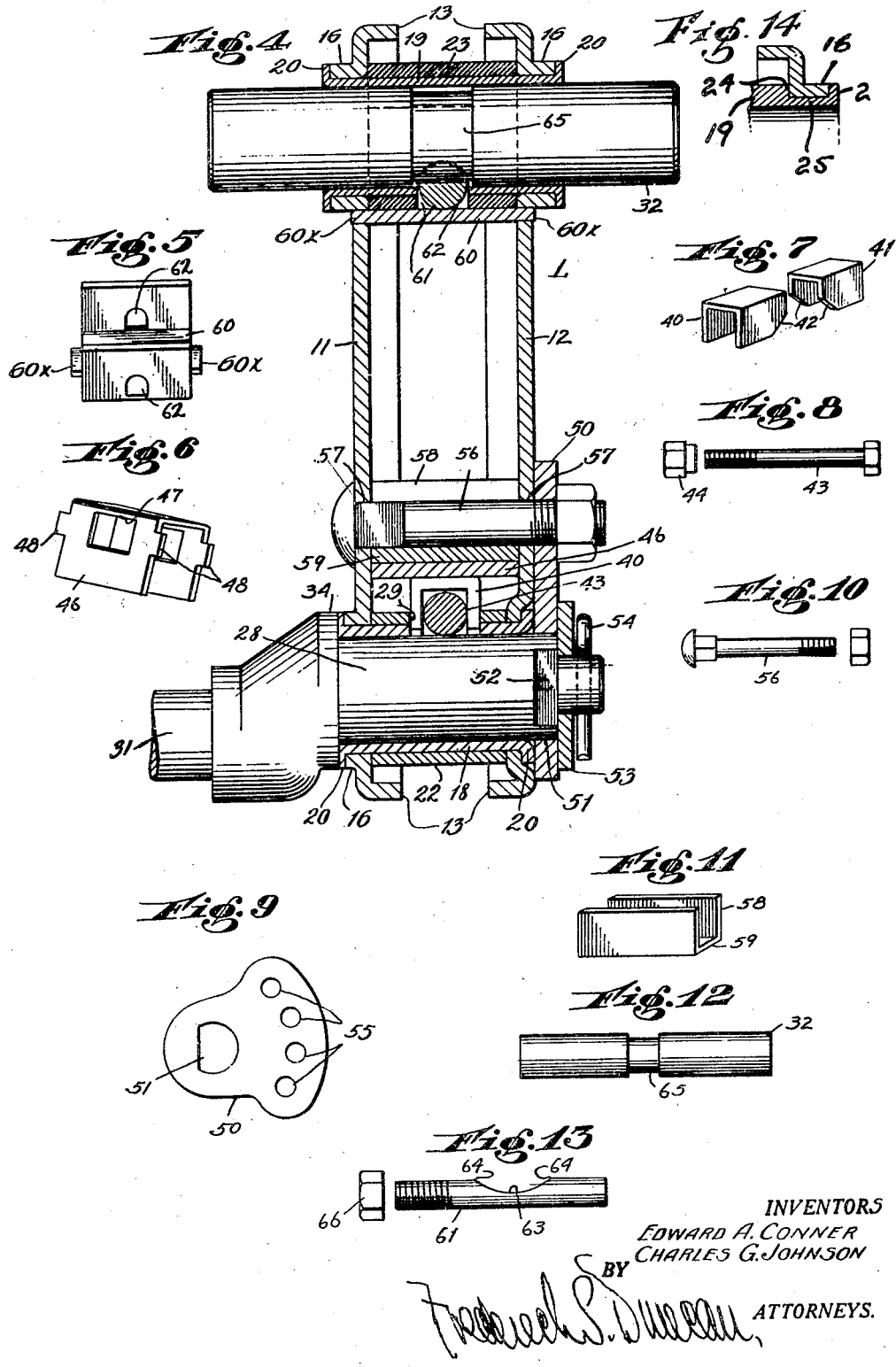
INVENTORS
EDWARD A. CONNER
CHARLES G. JOHNSON
BY
ATTORNEYS.

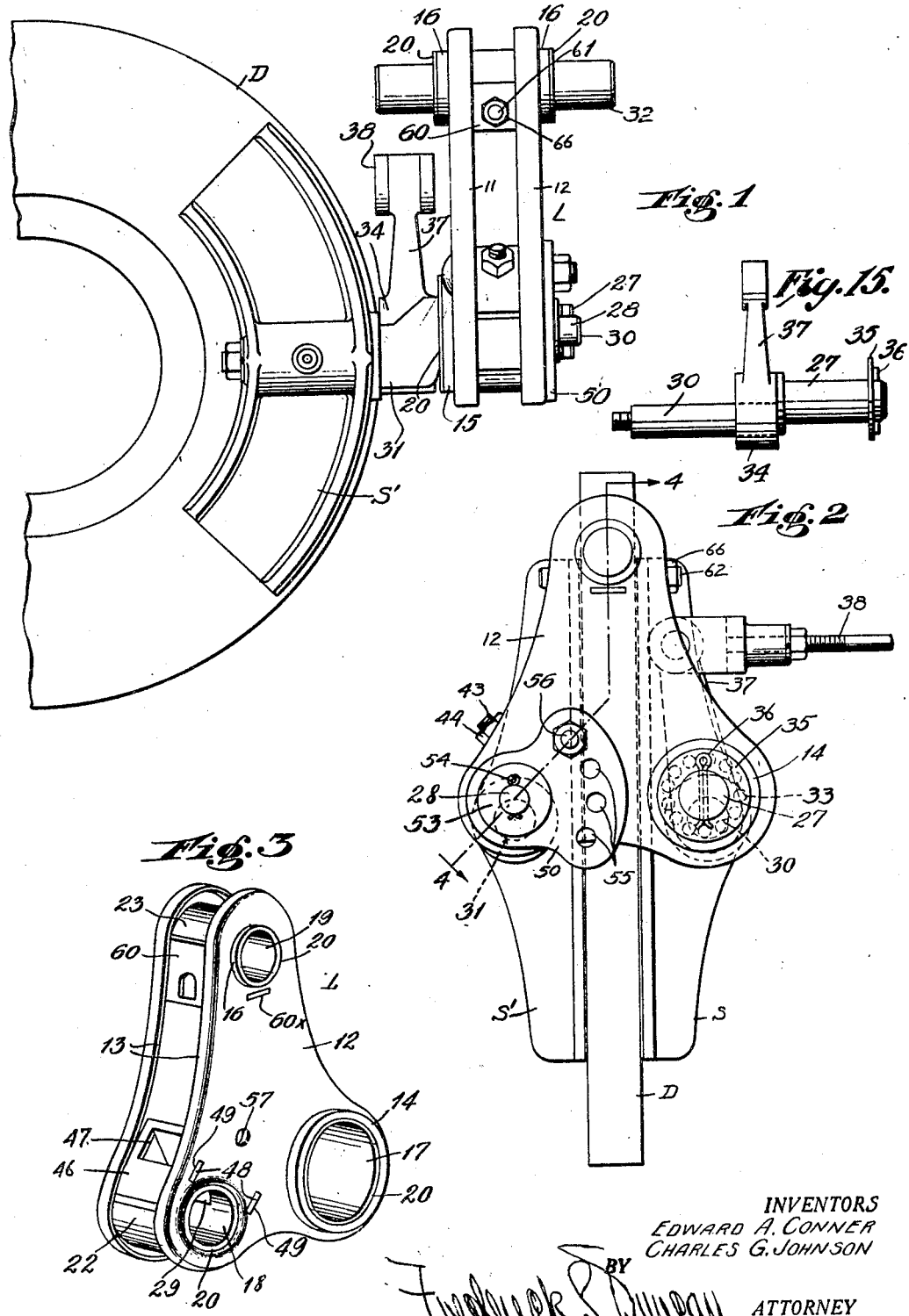

Patented Dec. 26, 1933

1,940,845

UNITED STATES PATENT OFFICE 1,940,845

BRAKE

Edward A. Conner, Stratford, and Charles G. Johnson, Bridgeport, Conn., assignors to American Cable Company, Inc., a corporation of Delaware Application August 30, 1930. Serial No. 478,810

9 Claims. (Cl. 188—72)

This invention relates to brakes for automobiles and the like and has for an object the provision of a brake assembly including a link of sturdy but simple and inexpensive construction adapted to support certain of the braking elements in a well-known type of automobile brake comprising, among other elements, brake shoes supported by the link on opposite sides of a rotor disk to be engaged frictionally by the shoes.

The invention has for a further object the provision of a brake link of the above type formed largely of members made from sheet metal pressed into shape for cooperation with each other to permit ready assembly of the link components, the parts when assembled constituting a unitary structure which is sufficiently sturdy to withstand the very considerable strains to which such a brake link is subjected in service.

A further object of the invention is to provide a method of forming such a link which avoids any substantial machining of the parts, and also obviates the necessity for any welding operations, making it possible to effect the permanent assembly of the link parts by a simple metal working operation preferably of the character of spinning the metal.

Among other objects of the invention are the provision of means for effecting readily the desirable adjustive movements of the brake shoes to secure their proper initial relative positions and the further adjustments necessary to compensate for wear in the braking parts, and also means for securing such adjusting means in place by easily operated bolts which add to the strength of the structure but are so arranged as to be free from binding strains which would interfere with their ready manipulation for purposes of inspection, adjustment, removal, and replacement.

The above and other features of the invention are illustrated and described fully in the accompanying drawings and specification, and are pointed out in the claims:

In the drawings,

Fig. 1 is a view in front elevation of a brake assembly in the construction of which the invention has been embodied.

Fig. 2 is a view of the same in side elevation.

Fig. 3 is a view in perspective of the link taken separately.

Fig. 4 is a view in vertical section, on a larger scale, taken on the line 4—4 of Fig. 2.

Figs. 5 and 6 are views in perspective of two yokes taken separately.

Fig. 7 is a view in perspective of two wedging members, taken separately.

Fig. 8 shows a clamping bolt.

Fig. 9 shows in side elevation an adjusting plate.

Fig. 10 shows a retaining bolt for said adjusting plate.

Fig. 11 shows an auxiliary spacing member.

Fig. 12 shows a supporting shaft.

Fig. 13 shows a clamping bolt for the supporting shaft.

Fig. 14 shows a modified form of connecting member.

Fig. 15 is a detail view showing the eccentric shafts for operating the brake shoes.

In the now preferred embodiment of the invention selected for illustration and description, the part designated generally by the reference character L is a link, which, in pursuance of the invention, is formed of a plurality of body or side members made of any suitable material, size and shape and, in the instance illustrated, is formed of two pieces of sheet steel 11 and 12 of generally triangular shape, having their margins pressed over to form strengthening flanges 13 extending preferably entirely around each piece. These side members are also preferably provided with several bosses, as, for example, those designated by the characters 14, 15, and 16, which are formed by stamping out apertures to receive various working parts of the brake, the material surrounding the apertures being pressed out to form the bosses, which extend outwardly from the face opposite that around which the flanges are formed.

The side members thus formed are assembled in spaced relation, with tubular connecting members 17, 18, and 19 of a suitable diameter to pass through the bosses in the side members with which they are associated, and sufficiently longer than the width of the assembled structure to provide lateral retaining flanges 20, which are formed preferably by spinning over the ends of the tubular members in overlapping relation with the mouths of the bosses, the tubular members thus serving, when the flanges have been so formed, to hold the side members in assembled relation.

In further pursuance of the invention, means are provided to maintain the side plates 11 and 12 in spaced relation, and such means may be of any suitable character, a now-preferred form of such means comprising auxiliary tubular members 21, 22 and 23, of suitable interior diameter to receive the tubular members 17, 18 and 19 respectively, and of suitable length to engage at their ends with the inner faces of the side plates 11 and 12, serving as abutments to space the plates at the desired distance apart, and co-operating with the flanges 20 to maintain the plates solidly in assembled position.

As an alternative arrangement, illustrated in Fig. 14, the tubular members 17, 18 and 19 may be formed of sufficient thickness at their portions between the side plates to provide shoulders 24 to be engaged with the inner surfaces of the side plates, the reduced portions 25 of the tubular members being bent over to form retaining flanges 26.

A link formed by the above method, and embodying the parts described, constitutes a sturdy unitary structure easily made at relatively small expense and avoiding any considerable machining.

In further pursuance of the invention, provision is made for mounting the various parts required for supporting the brake shoes in adjustable operative position upon the link and for mounting the link and its associated parts in proper position upon the supporting structure of the automobile and in proper operative position relatively to the rotor disk upon which the braking members are to act.

Any suitable supporting means may be adopted, in carrying this portion of the invention into effect, according to the character of the braking members, as the improved link already described is capable of use in a considerable variety of applications of the invention, with braking members of different types.

As a now preferred embodiment of the invention, the link is shown in connection with braking members in a brake assembly of the type which comprises a motor disk D mounted upon a suitable rotating part of an automobile, (not shown) such as a transmission shaft or a wheel, or in connection with any desired rotating part of the automobile or other machinery.

With this disk D, brake shoes S and S' are arranged, one on each side of the disk, for engagement with opposite faces thereof, and these shoes are journalled upon shafts or pins 27 and 28 each having a portion adapted to extend transversely through one of the bosses in the link, and each having a portion 30, 31 adapted to receive one of the brake shoes.

In brakes of the type selected for illustration, provision is made for an eccentric mounting of at least one of the brake shoes relatively to the center of the aperture in which its shaft is mounted, so that by a simple rotation of the shaft the brake shoe may be moved toward or from the face of the rotor disk, for the purpose of applying or releasing the brakes, the link being mounted to swing so that when one shaft is turned to bring its shoe into braking engagement with the rotor disk, the other shoe is thereby drawn into braking engagement with the opposite side of the rotor disk and both shoes are applied with equal force.

Where one of the shoes is thus provided with an eccentric mounting for the above purpose, the other shoe may be provided with a similar eccentric mounting for the purpose of varying the position of the shoes relatively to each other in order to set the shoes in the desired relative position when installing the brake, and to take up wear, etc.

This form of braking device is of a type which forms the subject matter of United States application of Ralph H. Rosenberg, filed August 25, 1927 Ser. No. 215,374, and of other applications for Letters Patent co-pending herewith, and it is not claimed generically as such herein, inasmuch as it forms the subject of claims in said patent and applications.

The eccentric mounting of the shoes may be provided for by any suitable means, and as one convenient form of construction the parts of the pins or shafts which carry the shoes may be offset from the parts of the shafts which are mounted in the link. Such an arrangement is illustrated in the drawings, in which the shaft portions 30 and 31 carrying the shoes are offset from the portions 27 and 28.

The shaft 27 has been selected, in the instance illustrated, to serve as the operating shaft, being mounted in suitable anti-friction bearings at 33 within the tubular member 17, the shaft 27 being held rotatably in its operative position relatively to the link by a washer 35 upon the shaft at one side of the link, a cotter pin 36 extending through the shaft to hold the parts in assembled relation. The shaft is held in place also by the hub 34 of an arm 37 which is fixed upon the shaft 27 at the other side of the link and which is connected by a suitable operating rod 38 to any suitable brake actuating lever.

The other shaft, 28, in the instance illustrated, has been arranged for rotation for purposes of varying the positions of the shoes relatively to each other, by moving the offset shaft part 31 which carries the shoe S' toward or away from the shoe S, and for this purpose the portion 28 of the shaft is mounted rotatably within the tubular member 18, and in pursuance of the invention novel means are provided for effecting such rotative adjustment and for securing this shaft in its various adjusted positions.

As one form of means to carry into effect this portion of the invention, there is illustrated a plurality of wedge members 40 and 41, each of these being preferably of approximately the U-shape illustrated and having bevelled portions 42 adapted to be brought into binding engagement with opposite portions of the shaft 28, for which purpose a bolt 43 is provided, with a nut 44, the bolt being held in place by a U-shaped yoke 46 having square apertures 47 to receive the clamping members 40 and 41 slidingly and hold them against rotation, so that when the bolt is tightened they will be drawn into retentive engagement with the shaft 28, at the middle thereof, which is exposed for that purpose by cutting away the material of the tubular members 18 and 22, as shown at 29.

Preferably the yoke 46 is arranged to form a permanent part of the link, for which purpose the yoke is provided with projections 48 to extend into slots 49 formed in the walls of the side plates 11 and 12 of the link, this arrangement preventing displacement of the yoke and its associated parts, while the yoke serves also as an additional strengthening element of the unitary link structure, being preferably of a suitable width to bear against the inner walls of the side plates 11 and 12. The clamping members 40 and 41 may be readily removed from the link for inspection, adjustment, removal and replacement, simply by removing the bolt 43, leaving the yoke 46 in place within the link, and it will be seen that when the bolt is tightened it aids to strengthen the link structure, while on the other hand the character of the yoke does no tend to cause any binding action or undue strain upon the bolt.

As an auxiliary means for rotative adjustment of the shaft 28 there is shown an adjusting plate 50 having a non-circular opening 51 mounted upon a slabbed-off part 52 of the shaft 30, the plate being held in place upon the shaft by a washer 53 and cotter pin 54, at a reduced portion 30 of the shaft 28.

When the bolt 43 and its clamping members 40 and 41 are loose, the shaft 28 may be turned by a rotative movement of the adjusting plate 50, and the latter is preferably provided with a series of holes 55 adapted to be transfixed alternatively by a retaining bolt 56 which passes through holes 57 in the side plates 11 and 12 respectively. This series of holes affords a means for readily effecting a definite rotative adjustment of the shaft 28 and a corresponding relative adjustment between the brake shoes S and S', and after this initial adjustment has been effected and the bolt 56 inserted and tightened, the clamping action of the clamps 40 and 41 may be completed in the manner heretofore described.

If for any reason the bolt 43 should become loose, it will be readily seen that the plate 50 will hold the shaft 28 against accidental rotative displacement.

In connection with the bolt 56, it is preferred to provide an auxiliary spacing member 58, preferably of U-shape in cross section and of a length just sufficient to bridge the space between the plates 11 and 12, serving as a strengthening member for the link.

The part 59 of this U-shaped auxiliary spacing member is preferably interposed between the bolt 56 and the yoke 46, whereby the member 58 is held in its proper position.

As already indicated briefly, the brake link and shoes are arranged for swinging movement as a unitary structure transversely of the plane of the disk D, to permit a floating movement of the brake-shoes as a unit, for which purpose the link with its associated parts are carried by a short shaft 32 which may be mounted upon any suitable supporting structure, such as the frame of an automobile.

In connection with this short shaft 32, it is preferred to provide a U-shaped positioning member or yoke 60 of suitable width to extend between the plates 11 and 12, engaging the inner faces thereof and serving as an additional spacing and strengthening means in supplement of the tubular spacing member 23 already described. This yoke is preferably provided with lugs 60x, fitted in suitable holes in the side plates, and constitutes a permanent member of the link structure. This member 60 is particularly designed, however, to support a locking bolt 61 which is positioned in slots 62 in the sides of the member 60, the bolt 61 having near its middle a cutaway portion 63 with bevelled portions 64, adapted to be drawn into locking engagement with a reduced part 65 near the middle of the shaft 32. By tightening the nut 66 the bolt 61 may be wedged against the shaft 32 sufficiently to prevent rotation of the shaft 32 relatively to the link, while the shaft 32 and link may have the desired swinging movements relatively to any supporting structure in which the shaft 32 is journalled. So long as the bolt 62 is tightly held by its nut, the shaft 32 cannot be removed from the link, but by loosening the nut 66, and placing the bolt so that the cutaway portion 63 is centrally disposed relatively to the cutaway portion 65 of the shaft 32, the latter may be withdrawn lengthwise from the link, facilitating the removal of the link and its assembled parts from the supporting structure.

We claim:

1. A supporting link for brake elements, said link being characterized by a plurality of apertured sheet metal plates arranged in spaced relation, and tubular connecting members extended between said plates and through said apertures, said tubular members having flanged portions extending laterally over the outer faces of said plates to retain said plates in assembled relation, and means to maintain said plates in spaced relation, said tubular members being adapted to receive brake shoe supporting shafts or pins.

2. A supporting link for brake elements, said link being characterized by a plurality of apertured sheet metal plates arranged in spaced relation, and tubular connecting members extended between said plates and through said apertures, said tubular members having flanged portions extending laterally over the outer faces of said plates to retain said plates in assembled relation, and means to maintain said plates in spaced relation, said tubular members being adapted to receive brake shoe supporting shafts or pins, and also to receive a shaft for supporting said hanger.

3. A supporting link for brake elements, said link being characterized by a plurality of apertured sheet metal plates arranged in spaced relation, and tubular connecting members extended between said plates and through said apertures, said tubular members having flanged portions extending laterally over the outer faces of said plates to retain said plates in assembled relation, means to maintain said plates in spaced relation, and yokes between said plates, each of said yokes being adapted to receive locking means for one of said shafts.

4. A supporting link for brake elements, comprising a plurality of pressed steel plates, sheet metal yokes between said plates, and tubular connecting members extending through said plates in the vicinity of said yokes, said parts being held in assembled relation by flanges on said tubular members bent over said plates.

5. The combination with a link for the purpose set forth, comprising a plurality of spaced metal plates connected by a tubular member, and a shaft extending through said tubular member, having an offset portion at one side of said link provided with a brake shoe, of an adjusting plate fixed upon said shaft adjacent to the other side of said link, having a series of index holes, and a bolt transfixing said link and a selected index hole, to hold said shaft and shoe in adjusted position.

6. The combination with a link for the purpose set forth, comprising a plurality of spaced metal plates connected by a tubular member, and a shaft extending through said tubular member, having an offset portion at one side of said link provided with a brake shoe, of an adjusting plate fixed upon said shaft adjacent to the other side of said link, having a series of index holes, and a bolt transfixing said link and a selected index hole, to hold said shaft and shoe in adjusted position and a U-shaped spacing member embracing said bolt between said plates.

7. The combination with a shaft mounted rotatably in a tubular supporting structure, of means to limit rotation of said shaft, comprising a yoke embracing said shaft and tubular structure and U-shaped clamping members mounted in openings in the arms of said yoke, having bevelled portions opposed to the periphery of said shaft, and a bolt engaged with said clamping members and adapted to draw the latter together against said shaft through an opening in the walls of said tubular structure.

8. In a brake link, for the purpose set forth, a framework comprising two spaced metal plates, a brake carrying shaft rotatably mounted in a bearing in said plates, an abutment parallel with the axis of said shaft and offset from the periphery thereof, a wedge member adapted to be forced between said abutment and said periphery, and means for drawing said wedge member into wedging relation between said abutment and said periphery and for retaining said wedge member in tight wedging relation therebetween.

9. A brake member comprising a supporting link provided with a cylindrical bearing having a portion of its periphery cutaway, and a shaft mounted in said bearing with a portion of its periphery exposed at said cutaway portion of the bearing, a yoke carried by said link adjacent to said bearing, and a retaining bolt mounted in said yoke at said cutaway portion of the bearing and extending transversely of the shaft, said bolt having the cutaway portion adapted to permit withdrawal of said shaft lengthwise from said bearing in one position of said bolt, and a cam surface on said bolt adapted to be forced against said shaft at said cutaway portion by lengthwise movement of said bolt, and means to move said bolt lengthwise into position to lock said shaft in said bearing and to maintain said bolt in said locking position.

EDWARD A. CONNER.
CHARLES G. JOHNSON.